(12) United States Patent
Kim et al.

(10) Patent No.: US 7,638,238 B2
(45) Date of Patent: Dec. 29, 2009

(54) ELECTRODE ASSEMBLY AND LITHIUM ION SECONDARY BATTERY USING THE SAME

(75) Inventors: Kwang Chun Kim, Seoul (KR); Jeong Man Park, Chungcheongnam-do (KR)

(73) Assignee: Samsung SDI Co., Ltd., Suwon-si (KR)

( * ) Notice: Subject to any disclaimer, the term of this patent is extended or adjusted under 35 U.S.C. 154(b) by 487 days.

(21) Appl. No.: 11/170,763

(22) Filed: Jun. 28, 2005

(65) Prior Publication Data

US 2006/0008701 A1   Jan. 12, 2006

(30) Foreign Application Priority Data

Jun. 28, 2004   (KR) .................... 10-2004-0048994

(51) Int. Cl.
*H01M 2/26* (2006.01)

(52) U.S. Cl. .................... 429/161; 429/94; 429/211; 429/189; 429/174

(58) Field of Classification Search .............. 429/174, 429/161, 94, 211, 181
See application file for complete search history.

(56) References Cited

U.S. PATENT DOCUMENTS

| 5,989,743 A * | 11/1999 | Yamashita | 429/129 |
| 6,379,403 B1 * | 4/2002 | Fukumura et al. | 29/623.5 |
| 2004/0121232 A1 * | 6/2004 | Kato et al. | 429/217 |

* cited by examiner

*Primary Examiner*—Jane Rhee
(74) *Attorney, Agent, or Firm*—Christie, Parker & Hale, LLP (57) ABSTRACT

An electrode assembly and a lithium ion secondary battery using the same capable of preventing a short circuit from being created in an outer peripheral portion of the electrode assembly. Uncoated areas of positive and negative electrode plates and an active material layer in the inner and outer peripheral portions of the electrode assembly are optimally aligned such that the thickness of the electrode assembly is uniformly formed widthwise along the electrode assembly.

14 Claims, 6 Drawing Sheets

ELECTRODE ASSEMBLY AND LITHIUM ION SECONDARY BATTERY USING THE SAME

CROSS REFERENCE TO RELATED APPLICATION

This application claims priority to and the benefit of Korea Patent Application No. 2004-0048994 filed on Jun. 28, 2004, in the Korean Intellectual Property Office, the entire content of which is incorporated herein by reference.

BACKGROUND OF THE INVENTION

1. Field of the Invention

The present invention relates to an electrode assembly and a lithium ion secondary battery using the same, and more particularly, to an electrode assembly and a lithium ion secondary battery capable of preventing a short circuit from being created in an outer peripheral portion of the electrode assembly.

2. Description of the Prior Art

As is generally known in the art, secondary batteries are different from primary batteries in that secondary batteries can charge and discharge electric power. Secondary batteries have been extensively used in advanced electronic technology fields for portable electronic appliances, such as portable phones, notebook computers and camcorders.

Particularly, lithium ion secondary batteries represent an operational voltage of about 3.7V, which is three times higher than that of Ni—Cd batteries or Ni-MH batteries used as power sources for portable electronic appliances. In addition, the lithium ion secondary batteries have high energy density per unit weight, so the lithium secondary batteries are extensively used in the advanced electronic technology fields.

In general, lithium ion secondary batteries include lithium-based oxides as positive electrode active materials and carbon materials as negative electrode active materials. In addition, secondary batteries are classified into liquid electrolyte batteries and high polymer electrolyte batteries according to the electrolytes used for the secondary batteries. The secondary batteries using the liquid electrolyte are called "lithium ion secondary batteries" and the secondary batteries using the high polymer electrolyte are called "lithium polymer secondary batteries". In addition, the lithium ion secondary batteries can be formed with various shapes, such as cylinder type lithium ion secondary batteries, can type lithium ion secondary batteries and pouch type lithium ion secondary batteries.

Figure 1:
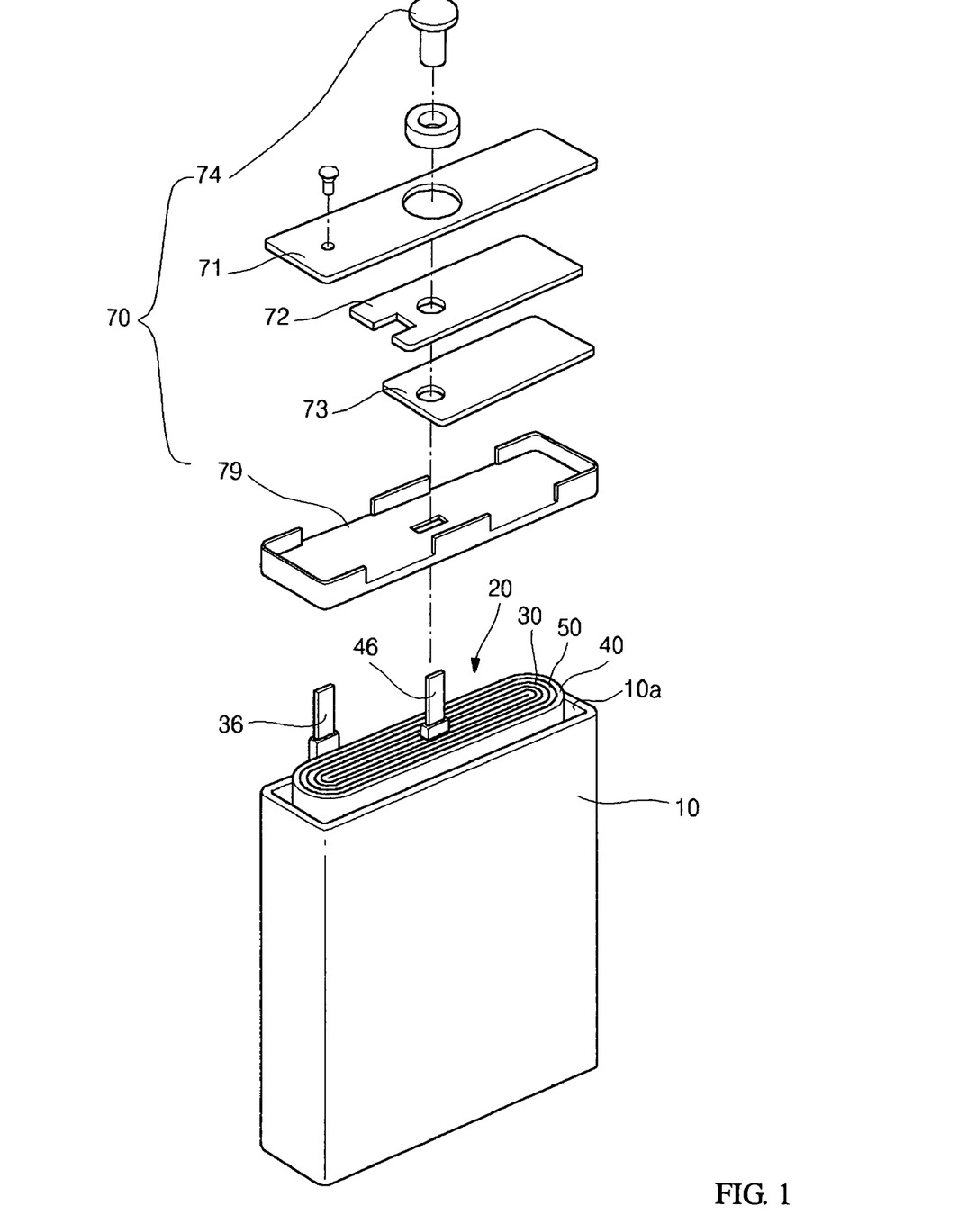
FIG. 1 is an exploded perspective view of a conventional lithium ion secondary battery.
Figure 2:
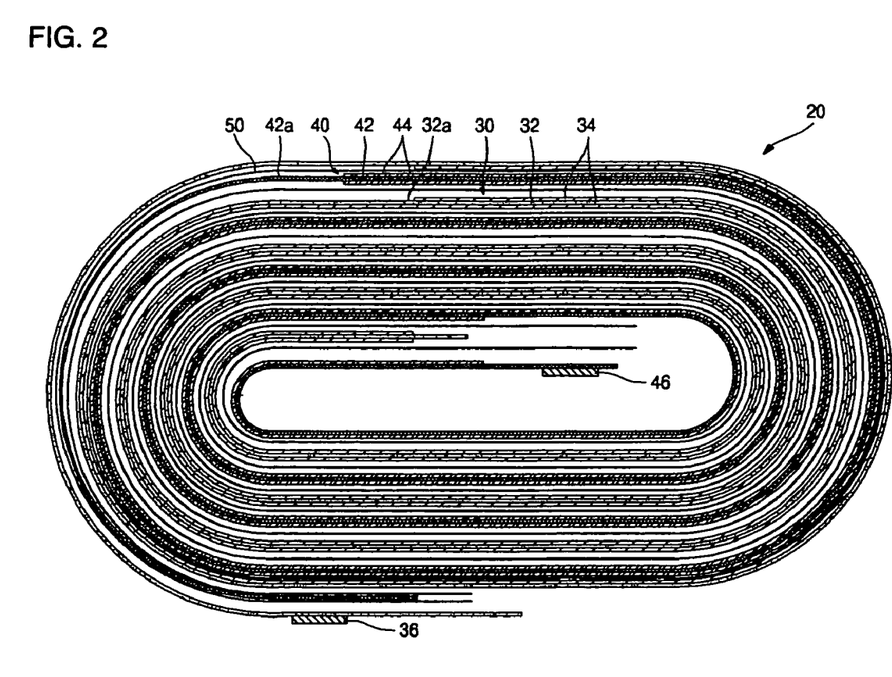
FIG. 2 is a plan view of a conventional electrode assembly.

As shown in FIGS. 1 and 2, the typical can type lithium ion secondary battery includes a can 10, an electrode assembly 20 accommodated in the can 10, and a cap assembly 70 for sealing an upper opening section of the can 10.

The can 10 is made from a metal having a hexahedral shape and acts as a terminal. The can 10 includes an upper opening section 10a through which the electrode assembly 20 is accommodated in the can 10.

Referring to FIG. 2, the electrode assembly 20 includes a positive electrode plate 30, a negative electrode plate 40, and a separator 50. The positive electrode plate 30 and the negative electrode plate 40 are wound in the form of a jelly-roll while interposing the separator 50 therebetween.

The positive electrode plate 30 includes a positive electrode collector 32 made from a laminated aluminum foil and a positive electrode active material layer 34 including lithium-based oxides coated on inner and outer surfaces of the positive electrode collector 32. The positive electrode collector 32 is formed with a positive electrode uncoated area 32a, in which the positive electrode active material layer 34 is not coated, corresponding to both ends of the positive electrode plate 30. A positive electrode tap 36 is fixed to the positive electrode uncoated area 32a by means of ultrasonic welding in such a manner that an end of the positive electrode tap 36 can upwardly protrude beyond an upper end of the positive electrode collector 32. The positive electrode tap 36 is generally made from Ni or a Ni-alloy. However, it is also possible to fabricate the positive electrode tap 36 by using other metallic materials.

The negative electrode plate 40 includes a negative electrode collector 42 made from a laminated aluminum foil and a negative electrode active material layer 44 including carbon materials coated on inner and outer surfaces of the negative electrode collector 42. The negative electrode collector 42 is formed with a negative electrode uncoated area 42a, in which the negative electrode active material layer 44 is not coated, corresponding to both ends of the negative electrode plate 40. A negative electrode tap 46 is fixed to the negative electrode uncoated area 42a by means of ultrasonic welding in such a manner that an end of the negative electrode tap 46 can upwardly protrude beyond an upper end of the negative electrode collector 42. The negative electrode tap 46 is generally made from Ni or a Ni-alloy. However, it is also possible to fabricate the negative electrode tap 46 by using other metallic materials.

The separator 50 is interposed between the positive electrode plate 30 and the negative electrode plate 40 so as to insulate the positive electrode plate 30 from the negative electrode plate 40. The separator 50 is made from polyethylene, polypropylene, or composition of polyethylene and polypropylene. In one exemplary embodiment, the separator 50 has a width larger than that of the positive electrode plate 30 and the negative electrode plate 40 in order to effectively prevent a short circuit between the positive electrode plate 30 and the negative electrode plate 40.

The cap assembly 70 includes a cap plate 71, an insulative plate 72, a terminal plate 73 and a negative electrode terminal 74. The cap assembly 70 is accommodated in a separate insulative case 79 and is coupled with the upper opening section 10a of the can 10 so as to seal the can 10.

Figure 3:
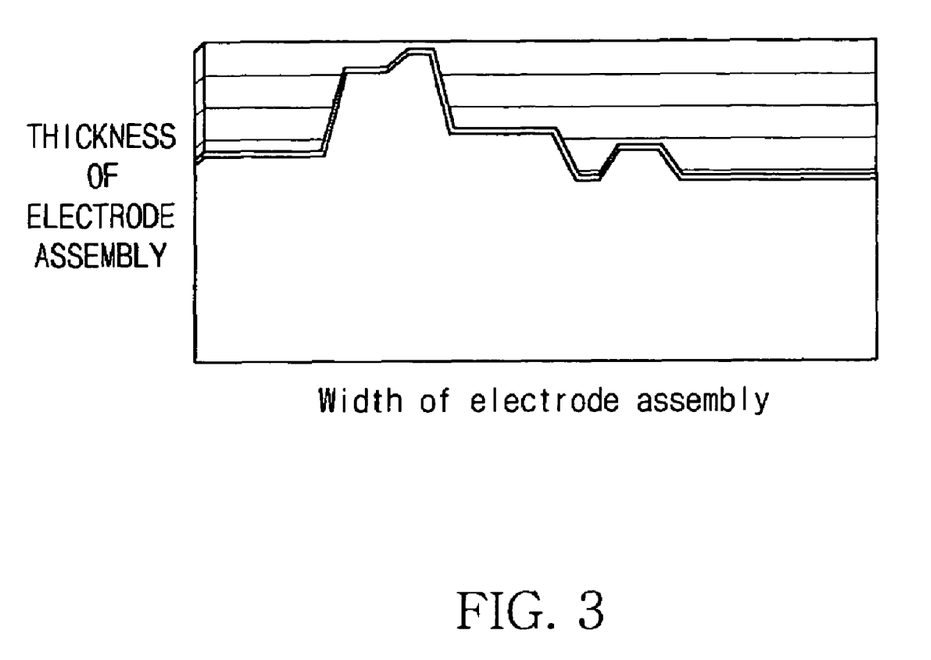
FIG. 3 is a graph illustrating thickness variation in a widthwise direction of the electrode assembly shown in FIG. 2.

However, referring to FIG. 2, the positive electrode tap 36 of the electrode assembly 20 is overlapped with the positive and negative electrode active material layers 34 and 44 of the positive and negative electrode plates 30 and 40 in a widthwise direction of the electrode assembly 20, so the thickness of the electrode assembly 20 becomes uneven widthwise along the electrode assembly 20. That is, as can be understood from a graph shown in FIG. 3, thickness variation may significantly occur in the widthwise direction of the electrode assembly 20. In particular, a left part of the graph shows a great increase of the thickness of the electrode assembly 20 relative to other parts thereof. This is because the positive electrode tap 36 may be in the left part together with the positive and negative electrode active material layers 34 and 44 of the positive and negative electrode plates 30 and 40. In this case, it is difficult to uniformly wind the electrode assembly 20 in a compact size so that the electrode assembly 20 accommodated in the can 10 cannot possess optimum volume. Accordingly, it is difficult to increase energy density of the secondary battery.

In addition, as energy density of the lithium ion secondary battery increases, heat is increasingly generated from the can during the overcharge/over-discharge or the short circuit between electrodes. Particularly, welding sections of the negative electrode plate 40 and the positive electrode plate 30 for the negative electrode tap 46 and the positive electrode tap 36 may be bonded with hetero-metal, internal resistance is increased in the welding sections of the negative electrode plate 40 and the positive electrode plate 30 so that the welding section generates a large amount of heat. If heat is generated in the vicinity of the electrode tap, the separator for insulating the positive electrode plate from the negative electrode plate may melt and shrink. In particular, a part making contact with the positive electrode tap shown in FIG. 2 generates a great amount of heat so an end portion of the separator positioned adjacent to the positive electrode plate may be significantly shrunk. In an extreme case, the separator aligned between the negative electrode plate and the positive electrode plate disappears. In this case, a short circuit could result between the positive electrode plate and the negative electrode plate.

SUMMARY OF THE INVENTION

In accordance with the present invention an electrode assembly and a lithium ion secondary battery using the same is provided capable of preventing a short circuit from being created in an outer peripheral portion of the electrode assembly by optimally aligning uncoated areas of positive and negative electrode plates and an active material layer in the inner and outer peripheral portions of the electrode assembly such that the thickness of the electrode assembly is uniformly formed widthwise along the electrode assembly.

According to one aspect of the present invention, there is provided an electrode assembly comprising: a positive electrode plate including a positive electrode collector and a positive electrode active material layer and formed at both sides thereof with a positive electrode uncoated area; a negative electrode plate including a negative electrode collector and a negative electrode active material layer and formed at both sides thereof with a negative electrode uncoated areas; a separator for insulating the positive electrode plate from the negative electrode plate; a positive electrode tap fixed to the positive electrode uncoated area; and a negative electrode tap fixed to the negative electrode uncoated area. When the positive electrode plate and the negative electrode plate are wound from an inner peripheral portion to an outer peripheral portion of the electrode assembly, an end portion of the negative electrode active material layer of the negative electrode plate formed in the outer peripheral portion of the electrode assembly is positioned in the positive electrode uncoated area of the positive electrode plate formed in the inner peripheral portion of the electrode assembly when viewed in a widthwise direction of the electrode assembly.

According to an exemplary embodiment of the present invention, an end portion of the positive electrode uncoated area of the positive electrode plate formed in the inner peripheral portion of the electrode assembly is aligned in an approximately same position as an end portion of the negative electrode active material layer of the negative electrode plate formed in the outer peripheral portion of the electrode assembly when viewed in the widthwise direction of the electrode assembly.

According to an exemplary embodiment of the present invention, an end portion of the positive electrode uncoated area formed on inner and outer surfaces of the positive electrode plate positioned in the outer peripheral portion of the electrode assembly is aligned within the negative electrode uncoated area formed on an outer surface of the negative collector positioned in the inner peripheral portion of the electrode assembly when viewed in the widthwise direction of the electrode assembly.

According to an exemplary embodiment of the present invention, an end portion of the negative electrode uncoated area formed on an outer surface of the negative electrode plate positioned in the inner peripheral portion of the electrode assembly is aligned in a approximately same position as the end portion of the positive electrode active material layer formed on an outer surface of the positive electrode plate positioned in the outer peripheral portion of the electrode assembly when viewed in the widthwise direction of the electrode assembly.

According to an exemplary embodiment of the present invention, the end portion of the negative electrode uncoated area formed on an outer surface of the negative electrode collector positioned in the inner peripheral portion of the electrode assembly is aligned in a approximately same position as the end portion of the positive electrode active material layer formed on an inner surface of the positive electrode collector positioned in the outer peripheral portion of the electrode assembly when viewed in the widthwise direction of the electrode assembly.

According to an exemplary embodiment of the present invention, an end portion of the positive electrode uncoated area of the positive electrode plate positioned in the inner peripheral portion of the electrode assembly is spaced from an end portion of the negative electrode uncoated area formed on inner and outer surfaces of the negative electrode plate by a predetermined distance in the widthwise direction of the electrode assembly within the negative electrode active material layer formed on inner and outer surfaces of the negative electrode plate positioned in the inner peripheral portion of the electrode assembly.

According to an exemplary embodiment of the present invention, the end portion of the positive electrode uncoated area of the positive electrode plate is spaced from the end portion of the negative electrode uncoated area formed on the inner and outer surfaces of the negative electrode plate by 2 to 4 mm.

According to an exemplary embodiment of the present invention, the end portion of the negative electrode active material layer of the negative electrode plate positioned in the outer peripheral portion of the electrode assembly is spaced from an end portion of the positive electrode active material layer formed on inner and outer surfaces of the positive electrode plate by a predetermined distance within the positive electrode uncoated area formed on the inner and outer surfaces of the positive electrode plate positioned in the outer peripheral portion of the electrode assembly.

According to an exemplary embodiment of the present invention, the end portion of the negative electrode active material layer of the negative electrode plate is spaced from the end portion of the positive electrode active material layer formed on the inner and outer surfaces of the positive electrode plate by 2 to 4 mm.

According to an exemplary embodiment of the present invention, the positive electrode tap is formed on the positive electrode uncoated area of the positive electrode plate positioned in the outer peripheral portion of the electrode assembly and is spaced from an end portion of the positive electrode uncoated area of the positive electrode plate positioned in the inner peripheral portion of the electrode assembly by a predetermined distance in a direction of the positive electrode active material layer of the positive electrode plate.

According to an exemplary embodiment of the present invention, the positive electrode tap is formed on an inner surface or an outer surface of the positive electrode uncoated area.

According to an exemplary embodiment of the present invention, the positive electrode tap is formed in opposition to the positive electrode uncoated area of the positive electrode plate positioned in the inner peripheral portion of the electrode assembly in the widthwise direction of the electrode assembly.

According to an exemplary embodiment of the present invention, the negative electrode uncoated area of the negative electrode plate positioned in the outer peripheral portion of the electrode assembly extends by a predetermined width from the end portion of the negative electrode active material layer of the negative electrode plate.

According to an exemplary embodiment of the present invention, an end portion of the negative electrode uncoated area is formed on a predetermined region in which the outer peripheral portion of the electrode assembly is linearly formed.

According to an exemplary embodiment of the present invention, the negative electrode uncoated area of the negative electrode plate has a width of about 2 mm to 4 mm.

According to another aspect of the present invention, there is provided a lithium ion secondary battery comprising: an electrode assembly including a negative electrode plate, a positive electrode plate, and a separator for insulating the negative electrode plate from the positive electrode plate; a can for receiving the electrode assembly; and a cap assembly including cap plate for sealing an upper opening section of the can and an electrode terminal inserted into a terminal hole formed in the cap plate while being insulated therefrom. When the positive electrode plate and the negative electrode plate are wound from an inner peripheral portion to an outer peripheral portion of the electrode assembly, an end portion of the negative electrode active material layer of the negative electrode plate formed in the outer peripheral portion of the electrode assembly is positioned in the positive electrode uncoated area of the positive electrode plate formed in the inner peripheral portion of the electrode assembly when viewed in a widthwise direction of the electrode assembly.

DETAILED DESCRIPTION

Figure 4:
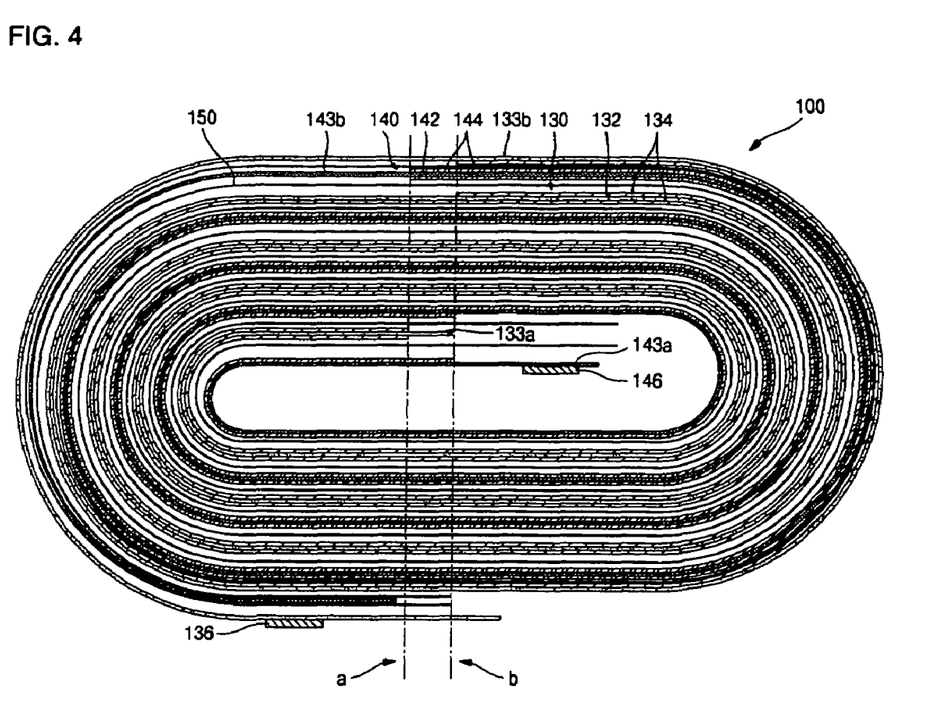
FIG. 4 is a plan view of an electrode assembly according to one exemplary embodiment of the present invention.

Referring to FIGS. 1 and 4, the lithium ion secondary battery according to the present invention includes a can 10, an electrode assembly 100 (in place of electrode assembly 20 of the prior art) accommodated in the can 10, and a cap assembly 70 for sealing an upper opening section of the can 10. Herein, the same reference numerals are used to designate the same or similar components of the conventional secondary battery.

Referring to FIG. 1, the can 10 is made from a metal having a hexahedral shape and acts as a terminal. The can 10 includes an upper opening section 10a through which the electrode assembly 100 is accommodated in the can 10.

The cap assembly 70 includes a cap plate 71, an insulative plate 72, a terminal plate 23 and a negative electrode terminal 74. The negative electrode terminal 74 is fixedly inserted into a terminal hole formed in the cap plate 71 while being insulated therefrom. The cap assembly 70 is accommodated in a separate insulative case 79 and is coupled with the upper opening section 10a of the can 10 so as to seal the can 10.

Referring to FIG. 4, the electrode assembly 100 includes a positive electrode plate 130, a negative electrode plate 140, and a separator 150. The positive electrode plate 130 and the negative electrode plate 140 are wound in a jelly-roll configuration while interposing the separator 150 therebetween.

In the following description, when the electrode assembly has been wound, a central portion of the electrode assembly is called an "inner peripheral potion" and an outer portion of the electrode assembly is called an "outer peripheral portion". Accordingly, the inner peripheral portion is opposite to the outer peripheral portion.

The electrode assembly 100 is provided at the inner peripheral portion thereof with a negative electrode tap 146 which is welded to a negative electrode uncoated area of the negative electrode plate 140 and upwardly protrudes beyond the upper portion of the electrode assembly 100. In addition, the electrode assembly 100 is provided at the outer peripheral portion thereof with a positive electrode tap 136, which is welded to a positive electrode uncoated area of the positive electrode plate 130 and upwardly protrudes beyond the upper portion of the electrode assembly 100. The position of the positive electrode tap 136 may be replaced with the position of the negative electrode tap 146.

The positive electrode plate 130 includes a positive electrode collector 132, a positive electrode active material layer 134, and the positive electrode tap 136.

The positive electrode collector 132 is made from laminated aluminum foil with a thickness in a range of between about 10 to 30 μm. The positive electrode collector 132 is formed at inner and outer surfaces thereof with the positive electrode active material layer 134, which is mainly composed of lithium-based oxides. In addition, positive electrode uncoated areas 133a and 133b, in which the positive electrode active material layer 134 is not coated, are formed on inner and outer surfaces of the positive electrode collector 132. However, in a predetermined outer peripheral region of the electrode assembly 100, the positive electrode active material layer 134 is formed only one surface of the positive electrode collector 132 and the positive electrode uncoated area 133b is formed on the other surface of the positive electrode collector 132. The positive electrode active material layer 134 is coated on inner and outer surfaces of the positive electrode collector 132 with a thickness in a range of about 60 to 100 μm.

The positive electrode tab 136 is fixed to the positive electrode uncoated area formed on one end of the positive electrode plate 130 through laser welding or resistance welding. The positive electrode tab 136 is made from Ni and an upper end of the positive electrode tab 136 upwardly protrudes beyond the upper end of the positive electrode collector 132. In one exemplary embodiment, the positive electrode tap 136 has a thickness of about 80 to 120 μm.

The negative electrode plate 140 includes a negative electrode collector 142, a negative electrode active material layer 144, a negative electrode tap 146, and a negative electrode insulative plate 148.

The negative electrode collector 142 is made from laminated aluminum foil with a thickness in a range of about 10 to 30 μm. The negative electrode collector 142 is formed at inner and outer surfaces thereof with the negative electrode active material layer 144, which is mainly composed of carbon materials. In addition, negative electrode uncoated areas 143a and 143b, in which the negative electrode active material layer 144 is absent, are formed on inner and outer surfaces of the negative electrode collector 142. However, in a predetermined inner peripheral region of the electrode assembly 100, the negative electrode active material layer 144 is formed only one surface of the negative electrode collector 142 and the negative electrode uncoated area 143a is formed on the other surface of the negative electrode collector 142. The negative electrode active material layer 144 is coated on inner and outer surfaces of the negative electrode collector 142 with a thickness in a range of between about 80 to 100 μm.

The negative electrode tab 146 is made from Ni and fixed to the negative electrode uncoated area of the negative electrode plate 140 positioned at the inner peripheral portion of the electrode assembly 100 through laser welding or resistance welding. An upper end of the negative electrode tab 146 upwardly protrudes beyond the upper end of the negative electrode collector 142. In one exemplary embodiment, the negative electrode tap 146 has a thickness of about 80 to 120 μm.

Referring to FIG. 4, the separator 150 is interposed between the positive electrode plate 130 and the negative electrode plate 140 so as to insulate the positive electrode plate 130 from the negative electrode plate 140 when they are wound in order to form the electrode assembly 100.

Hereinafter, the position of the active material layers 134 and 144 in the positive electrode plate 130 and the negative electrode plate 140, respectively, of the electrode assembly 100 will be described in more detail. It should be noted that the electrode assembly 100 is wound from the inner peripheral portion to the outer peripheral portion thereof.

Predetermined reference lines "a" and "b" are formed vertically to the widthwise direction of the electrode assembly 100. Reference lines "a" and "b" are adopted to precisely explain the relationship between the uncoated areas and the active material layers which are formed in the inner peripheral portion and the outer peripheral portion of the electrode assembly 100, respectively, after the electrode assembly 100 has been formed.

In addition, surfaces of the positive and negative electrode plates 130 and 140 facing a central portion of the electrode assembly 100 will be referred to as "inner surfaces" and surfaces of the positive and negative electrode plates 130 and 140 opposite to the inner surfaces will be referred to as "outer surfaces".

First, the description will be made in relation to positions of the positive electrode uncoated area 133a of the positive electrode plate 130 formed in the inner peripheral portion of the electrode assembly 100 and the end portion of the negative electrode active material layer 144 of the negative electrode plate 140 formed in the outer peripheral portion of the electrode assembly 100.

The positive electrode plate 130 positioned in the inner peripheral portion of the electrode assembly 100 includes the positive electrode uncoated area 133a, which is formed between the positive electrode plate 130 and the negative electrode plate 140 and provided on inner and outer surfaces of the positive electrode collector 132 with a predetermined width. In one exemplary embodiment, the width of the positive electrode uncoated area 133a of the positive electrode plate 130 is at least 2 mm. If the width of the positive electrode uncoated area 133a is less than 2 mm, the positive electrode active layer 134 may be excessively formed beyond the positive electrode collector 132 when forming the positive electrode active layer 134 on the positive electrode collector 132 of the positive electrode plate 130, thereby causing waste of the active materials.

The end portion of the negative electrode active material layer 144 of the negative electrode plate 140 positioned in the outer peripheral portion of the electrode assembly 100 is formed within the positive electrode uncoated area 133a of the positive electrode plate 130 positioned in the inner peripheral portion of the electrode assembly 100 when the positive electrode plate 130 and the negative electrode plate 140 have been wound from the inner peripheral portion to the outer peripheral portion of the electrode assembly 100. More specifically, the end portion of the negative electrode active material layer 144 of the negative electrode plate 140 is positioned between an end portion (reference line "a") of the positive electrode uncoated area 133a of the positive electrode plate 130 positioned in the inner peripheral portion of the electrode assembly 100 and an end portion of the positive electrode plate 130. In one exemplary embodiment, the end portion of the negative electrode active material layer 144 of the negative electrode plate 140 and the end portion of the positive electrode uncoated area 133a of the positive electrode plate 130 are positioned in line with reference line "a". In this case, thickness variation of the electrode assembly 100 can be minimized while maximizing areas of the positive electrode active layer 134 and the negative electrode active material layer 144.

The positions of the end portion of the negative electrode uncoated area 143a of the negative electrode plate 140 formed in the inner peripheral portion of the electrode assembly 100 and the end portion of the positive electrode active layer 134 of the positive electrode plate 130 formed in the outer peripheral portion of the electrode assembly 100 will now be described.

The negative electrode plate 140 positioned in the inner peripheral portion of the electrode assembly 100 extends from a predetermined inner peripheral portion of the electrode assembly 100, and the negative electrode uncoated area 143a is formed on inner and outer surfaces of the negative electrode collector 142 of the negative electrode plate 140. Since the negative electrode tap 146 is installed on the negative electrode uncoated area 143a, the negative electrode uncoated area 143a must have a sufficient width for installing the negative electrode tap 146 thereon. The negative electrode uncoated area 143a extends from the end portion of the negative electrode plate 140 by a predetermined distance. Referring to FIG. 4, the negative electrode uncoated area 143a is formed on inner and outer surfaces of the negative electrode collector 142 in a region between the end portion of the negative electrode collector 142 and reference line "b." At reference line "b," the negative electrode active material layer 144 is formed on the outer surface of the negative electrode collector 142, and the negative electrode uncoated area 143a is formed on the inner surface of the negative electrode collector 142. When the negative electrode plate 140 has been wound once, the negative electrode uncoated area 143a is not provided in the inner surface of the negative electrode collector 142 and the negative electrode active material layer 144 is formed on the inner and outer surfaces of the negative electrode collector 142 from reference line "b." Therefore, the end portion of the negative electrode uncoated area 143a formed in the inner surface of the negative electrode plate 140 and the end portion of the negative electrode uncoated area 143a formed in the outer surface of the negative electrode plate 140 may simultaneously end at reference line "b" when viewed in the widthwise direction of the electrode assembly 100.

When the positive electrode plate 130 is positioned in the outer peripheral portion of the electrode assembly 100, at the outer surface of the positive electrode collector 132 positioned before an outermost portion of the electrode assembly 100 the end portion of the positive electrode active material layer 134 is positioned within the negative electrode uncoated area 143a formed on the outer surface of the negative electrode plate 140 positioned in the inner peripheral portion of the electrode assembly 100 when viewed in the widthwise direction of the electrode assembly 100. In addition, at the inner surface of the positive electrode collector 132 positioned at the outermost portion of the electrode assembly 100, the end portion of the positive electrode active material layer 134 is positioned within the negative electrode uncoated area 143a formed on the outer surface or the inner surface of the negative electrode plate 140 positioned in the inner peripheral portion of the electrode assembly 100 when viewed in the widthwise direction of the electrode assembly 100.

Therefore, a start portion of the positive electrode uncoated area 133b formed on the inner and outer surfaces of the positive electrode plate 130 positioned in the outer peripheral portion of the electrode assembly 100, that is, the end portion of the positive electrode active material layer 134 of the positive electrode plate 130 is formed within the negative electrode uncoated area 143a formed on the outer surface of the negative electrode plate 140 positioned in the inner peripheral portion of the electrode assembly 100. In one exemplary embodiment, the end portion of the positive electrode active material layer 134 formed on the outer surface of the positive electrode connector 132 positioned in the outer peripheral portion of the electrode assembly 100 and the end portion of the positive electrode active material layer 134 formed on the inner surface of the positive electrode connector 132 are provided in the same position as the end portion of the negative electrode uncoated area 143a formed on the outer surface of the negative electrode plate 140 positioned in the inner peripheral portion of the electrode assembly 100 when viewed in the widthwise direction of the electrode assembly 100. In other words, the end portion of the positive electrode active material layer 134 formed on the outer surface of the positive electrode connector 132, the end portion of the positive electrode active material layer 134 formed on the inner surface of the positive electrode connector 132, and the end portion of the negative electrode uncoated area 143a formed on the outer surface of the negative electrode plate 140 positioned in the inner peripheral portion of the electrode assembly 100 are positioned in reference line "b." In this case, thickness variation of the electrode assembly 100 can be minimized while maximizing areas of the positive electrode active layer 134 and the negative electrode active material layer 144.

In addition, reference line "b" is spaced from reference line "a" by a predetermined distance. Thus, the end portion of the positive electrode uncoated area 133a of the positive electrode plate 130 positioned in the inner peripheral portion of the electrode assembly 100 is spaced from the end portion of the negative electrode uncoated area formed on the inner and outer surfaces of the negative electrode collector 142 positioned in the inner peripheral portion of the electrode assembly 100. In one exemplary embodiment, the end portion of the positive electrode uncoated area 133a is spaced from the end portion of the negative electrode uncoated area 143a by a predetermined distance of about 2 to 4 mm. If the distance between the end portion of the positive electrode uncoated area 133a and the end portion of the negative electrode uncoated area 143a is less than 2 mm, the positive electrode active material layer 134 may make direct contact with the negative electrode uncoated area 143a of the negative electrode plate 140 when the positive electrode plate 130 and the negative electrode plate 140 are wound together. In addition, if the distance between the end portion of the positive electrode uncoated area 133a and the end portion of the negative electrode uncoated area 143a is larger than 4 mm, the size of the positive electrode active material layer 134 is reduced, thereby lowering capacity of the secondary battery.

In addition, the end portion of the negative electrode active material layer 144 positioned in the outer peripheral portion of the electrode assembly 100 is positioned within the positive electrode uncoated area 133b formed on the inner and outer surfaces of the positive electrode plate 130 positioned in the outer peripheral portion of the electrode assembly while being spaced from the end portion of the positive electrode active material layer 134 formed on the inner and outer surfaces of the positive electrode plate 130 by a predetermined distance. In one exemplary embodiment, the end portion of the negative electrode active material layer 144 of the negative electrode plate 140 is spaced from the end portion of the positive electrode active material layer 134 of the positive electrode plate 130 by a predetermined distance of about 2 to 4 mm. If the distance between the end portion of the negative electrode active material layer 144 and the end portion of the positive electrode active material layer 134 is less than 2 mm, the positive electrode active material layer 134 may make direct contact with the negative electrode uncoated area 143a of the negative electrode plate 140 when the positive electrode plate 130 and the negative electrode plate 140 are wound together. In addition, if the distance between the end portion of the negative electrode active material layer 144 and the end portion of the positive electrode active material layer 134 is larger than 4 mm, the size of the positive electrode active material layer 134 is reduced, thereby lowering capacity of the secondary battery.

The positive electrode uncoated area 133b of the positive electrode plate 130 may be formed by further winding the positive electrode plate 130 halfway around the electrode assembly 100.

The positive electrode tap 136 is installed on the positive electrode uncoated area 133b of the positive electrode plate 130 positioned in the outer peripheral portion of the electrode assembly 100 while being spaced from the end portion of the positive electrode uncoated area 133a of the positive electrode plate 130 positioned in the inner peripheral portion of the electrode assembly 100 by a predetermined distance in the direction of the positive electrode active material layer 134 of the positive electrode plate 130. At this time, the positive electrode cap 136 may be formed on the inner surface of the outer surface of the positive electrode uncoated area 133b. In one exemplary embodiment, the positive electrode cap 136 is aligned in opposition to the positive electrode uncoated area 133a of the positive electrode plate 130 positioned in the inner peripheral portion of the electrode assembly 100 when viewed in the widthwise direction of the electrode assembly 100. The positive electrode uncoated area 133b of the positive electrode plate 130 may discharge heat generated from the inner portion of the electrode assembly 100 to an exterior so the positive electrode uncoated area 133b has a predetermined length sufficient for discharging heat to the exterior.

The negative electrode cap 146 may be formed on the inner surface of the outer surface of the negative electrode uncoated area 143b formed on the outer surface of the negative electrode plate 140 positioned in the inner peripheral portion of the electrode assembly 100.

According to the electrode assembly 100 having the above structure, start portions of the uncoated areas of the positive and negative electrode plates 130 and 140 are identical to the end portion of the active material layers 134 and 144 of the positive and negative electrode plates 130 and 140, so the thickness of the electrode assembly 100 may be uniformly formed.

Although FIG. 4 shows reference lines "a" and "b" aligned in the center portion of the electrode assembly 100, reference lines "a" and "b" may be shifted from the center portion of the electrode assembly 100 by a predetermined distance. At this time, the positions of the uncoated areas of the positive and negative electrode plates 130, 140 relative to the positions of the active material layers 134, 144 of the positive and negative electrode plates 130, 140, respectively, are not changed.

Figure 5:
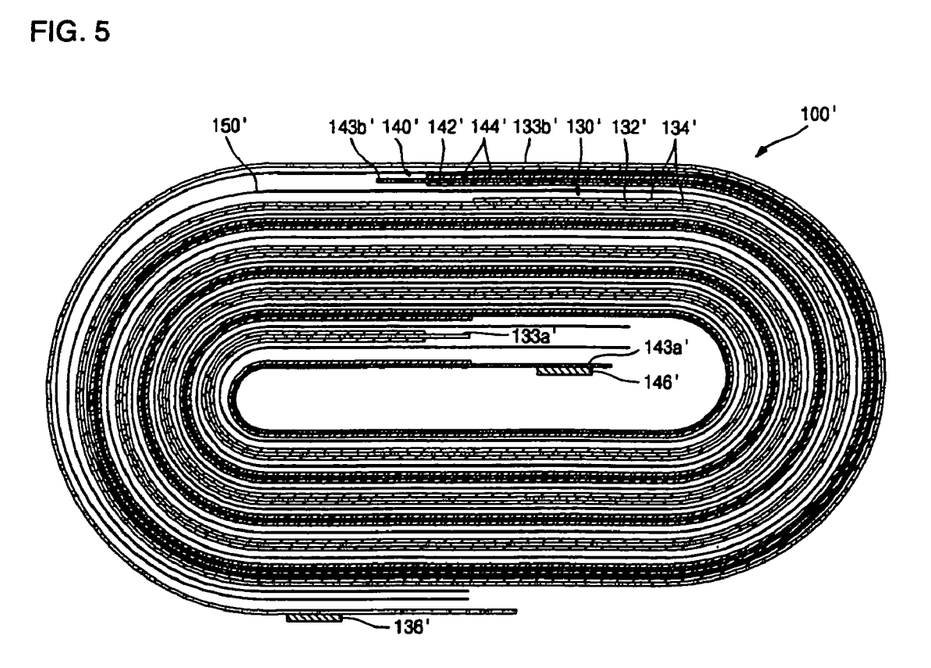
FIG. 5 is a plan view of an electrode assembly according to another exemplary embodiment of the present invention.

FIG. 5 shows an electrode assembly according to another exemplary embodiment of the present invention. Hereinafter, the electrode assembly shown in FIG. 5 will be described on the basis of differences thereof with regard to the electrode assembly shown in FIG. 4.

Referring to FIG. 5, the electrode assembly 100' includes a negative electrode plate 140' positioned in the outer peripheral portion of the electrode assembly 100' and formed with a negative electrode uncoated area 143b' having a relatively short width. In one exemplary embodiment, the width of the negative electrode uncoated area 143b' of the negative electrode plate 140' is about 2 to 4 mm from an end portion of the negative electrode active material layer 144' of the negative electrode plate 140'. If the width of the negative electrode uncoated area 143b' of the negative electrode plate 140' is less than 2 mm, the negative electrode active material layer 144' may be excessively formed beyond a negative electrode collector 142' when forming the negative electrode active material layer 144' on the negative electrode collector 142'. In addition, if the width of the negative electrode uncoated area 143b' of the negative electrode plate 140' is larger than 4 mm, the length of the negative electrode uncoated area 143b' is unnecessarily lengthened.

A separator 150' may extend to the end portion of a positive electrode plate 130' from the inner peripheral portion of the electrode assembly 100'.

Therefore, an increase of the thickness of the electrode assembly 100' caused by the positive electrode tap 136' can be minimized. In addition, even if the separator 150' shrinks due to heat generated from the secondary battery, the negative electrode uncoated area 143b' of the negative electrode plate 140' may not be exposed.

Hereinafter, an operation of the electrode assembly according to exemplary embodiments of the present invention will be described.

Figure 6:
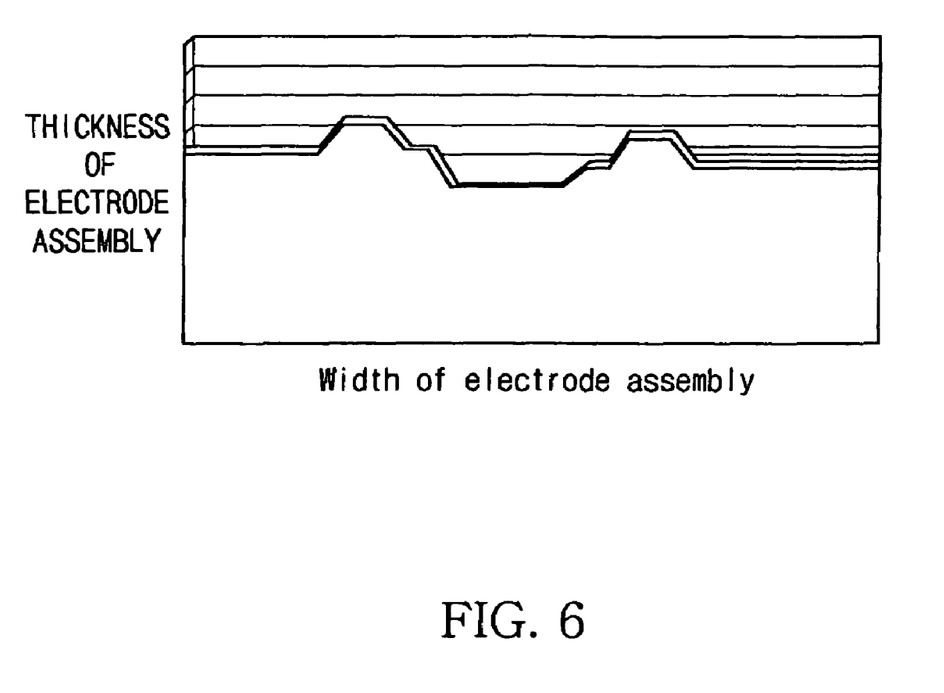
FIG. 6 is a graph illustrating thickness variation in a widthwise direction of an electrode assembly shown in FIG. 4.

Referring to FIG. 6, unlike the conventional electrode assembly (see, FIG. 3), the thickness of the exemplary electrode assembly 100 of the present invention may not vary significantly. That is, the thickness of the electrode assembly 100 may be evenly formed in the widthwise direction of the electrode assembly 100 without creating significant thickness variation.

In addition, since the thickness of the lithium ion secondary battery employing the electrode assembly 100 may be evenly formed in the widthwise direction thereof, an outer appearance of the lithium ion secondary battery, particularly, the thickness of the lithium ion secondary battery may be easily managed.

Although embodiments of the present invention has been described in relation to the can type electrode assembly having a jelly roll type electrode assembly, the embodiments described are applicable not only for a square type secondary battery, but also for a pouch type secondary battery using a jelly roll type electrode assembly.

According to exemplary embodiments of the present invention, the thickness of the electrode assembly may be uniformly formed in the widthwise direction thereof by optimally aligning the uncoated areas and active material layers in the inner and outer peripheral portions of the electrode assembly used for the secondary battery.

In addition, according to exemplary embodiments of the present invention, the length of the negative electrode uncoated area of the negative electrode plate formed in the outer peripheral portion of the electrode assembly may be minimized so that a short circuit can be prevented between the negative electrode plate and the positive electrode plate even if the separator has shrunk due to heat generated in the vicinity of the positive electrode tap, thereby improving stability of the secondary battery.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. An electrode assembly comprising:
a first electrode plate including a first surface and a second surface partially coated with a first electrode active material layer meeting a first electrode uncoated area absent the first electrode active material at a first electrode active material layer interface;
a second electrode plate having a polarity opposite the first electrode plate and including a first surface and a second surface partially coated with a second electrode active material layer meeting a second electrode uncoated area absent the second electrode active material at a second electrode active material layer interface; and
a separator between the first electrode plate and the second electrode plate for insulating the first electrode plate from the second electrode plate; wherein, the first electrode plate and the second electrode plate are arranged in a wound configuration such that the first electrode active material layer interface is on an innermost wind and the second electrode uncoated area is on an outermost wind and the second electrode active material layer at the second electrode active material layer interface is generally parallel to the first electrode uncoated area at the first electrode active material layer interface, and wherein the first electrode active material layer extends in a first direction at the first electrode active material layer interface and the second electrode active material layer extends in a second direction substantially opposite the first direction at the second electrode active material layer interface when the electrode assembly is viewed in a widthwise direction, such that variation of a thickness of the electrode assembly is minimized.

2. The electrode assembly as claimed in claim 1, wherein the first electrode active material interface is aligned with the second electrode active material interface when the electrode assembly is viewed in the widthwise direction.

3. The electrode assembly as claimed in claim 1, wherein the second electrode plate includes a coated portion on an innermost wind on which the second electrode active material layer is coated on only the first surface and wherein the first electrode uncoated area has an end portion aligned within and overlapping with the coated portion on an innermost wind when the electrode assembly is viewed in the widthwise direction.

4. The electrode assembly as claimed in claim 3, wherein an end portion of the coated portion of the second electrode plate on the innermost wind is approximately aligned with an end portion of the first electrode active material layer on only a first surface of the first electrode plate of the electrode assembly when viewed in the widthwise direction of the electrode assembly.

5. The electrode assembly as claimed in claim 4, wherein an end portion of the coated portion on an innermost wind of the second electrode is approximately aligned with the end portion of the first electrode active material layer on only the second surface of the first electrode collector when the electrode assembly is viewed in the widthwise direction.

6. The electrode assembly as claimed in claim 1, wherein the first electrode active material layer interface is spaced from the second electrode active material layer interface in the widthwise direction of the electrode assembly.

7. The electrode assembly as claimed in claim 6, wherein the first electrode active material layer interface is spaced from the second electrode active material layer interface by between about 2 mm to 4 mm.

8. The electrode assembly as claimed in claim 1, further comprising a first electrode second uncoated area at an outermost wind of the first electrode and a first electrode tap on the first electrode second uncoated area, wherein the first electrode tap is spaced from the first electrode active material layer interface along a direction of the first electrode active material layer of the first electrode plate.

9. The electrode assembly as claimed in claim 8, wherein the first electrode tap is on one of the first surface and the second surface of the first electrode second uncoated area.

10. The electrode assembly as claimed in claim 1, further comprising a first electrode tap on the first electrode uncoated area.

11. The electrode assembly as claimed in claim 8, further comprising a second electrode second uncoated area at an innermost wind of the second electrode and a second electrode tap on the second electrode second uncoated area.

12. The electrode assembly as claimed in claim 1, wherein the second electrode uncoated area is located at an end of the second electrode plate.

13. The electrode assembly as claimed in claim 12, wherein the second electrode uncoated area has a width of between about 2 mm to 4 mm.

14. A lithium ion secondary battery comprising:
an electrode assembly including a second electrode plate, a first electrode plate, and a separator for insulating the second electrode plate from the first electrode plate;
a can for receiving the electrode assembly; and
a cap assembly including cap plate for sealing an upper opening section of the can and an electrode terminal inserted into a terminal hole formed in the cap plate while being insulated therefrom, wherein the electrode assembly includes:
  a first electrode plate including a first surface and a second surface partially coated with a first electrode active material layer meeting a first electrode uncoated area absent the first electrode active material at a first electrode active material layer interface;
  a second electrode plate having a polarity opposite the first electrode plate and including a first surface and a second surface partially coated with a second electrode active material layer meeting a second electrode uncoated area absent the second electrode active material at a second electrode active material layer interface; and
  a separator for insulating the first electrode plate from the second electrode plate; wherein, the first electrode plate and the second electrode plate are arranged in a wound configuration such that the first electrode active material layer interface is on an innermost wind and the second electrode uncoated area is on an outermost wind and the second electrode active material layer at the second electrode active material layer interface is generally parallel to the first electrode uncoated area at the first electrode active material layer interface, and wherein the first electrode active material layer extends in a first direction at the first electrode active material layer interface and the second electrode active material layer extends in a second direction substantially opposite the first direction at the second electrode active material layer interface when the electrode assembly is viewed in a widthwise direction, such that variation of a thickness of the electrode assembly is minimized.

* * * * *

UNITED STATES PATENT AND TRADEMARK OFFICE
CERTIFICATE OF CORRECTION

| | |
|---|---|
| PATENT NO. | : 7,638,238 B2 |
| APPLICATION NO. | : 11/170763 |
| DATED | : December 29, 2009 |
| INVENTOR(S) | : Kim et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 671 days.

Signed and Sealed this

Ninth Day of November, 2010

David J. Kappos
*Director of the United States Patent and Trademark Office*